United States Patent
Annangi et al.

(10) Patent No.: US 12,478,349 B2
(45) Date of Patent: Nov. 25, 2025

(54) AUTOMATION OF TRANSVAGINAL ULTRASOUND WORKFLOW

(71) Applicant: GE Precision Healthcare LLC, Waukesha, WI (US)

(72) Inventors: Pavan Annangi, Karnataka (IN); Deepa Anand, Karnataka (IN); Bhushan D Patil, Karnataka (IN); Stephan Anzengruber, Zipf (AT)

(73) Assignee: GE PRECISION HEALTHCARE LLC, Waukesha, WI (US)

( * ) Notice: Subject to any disclaimer, the term of this patent is extended or adjusted under 35 U.S.C. 154(b) by 95 days.

(21) Appl. No.: 18/505,994

(22) Filed: Nov. 9, 2023

(65) Prior Publication Data
US 2025/0152139 A1   May 15, 2025

(51) Int. Cl.
*A61B 8/00* (2006.01)
*A61B 8/08* (2006.01)
*A61B 8/12* (2006.01)

(52) U.S. Cl.
CPC .............. *A61B 8/483* (2013.01); *A61B 8/12* (2013.01); *A61B 8/463* (2013.01); *A61B 8/466* (2013.01)

(58) Field of Classification Search
CPC ........... A61B 8/483; A61B 8/12; A61B 8/463; A61B 8/466; A61B 8/523; A61B 8/5223
See application file for complete search history.

(56) References Cited

U.S. PATENT DOCUMENTS

2018/0042577 A1* 2/2018 Perrey ................. A61B 8/085
2020/0187896 A1   6/2020 Singhal et al.

OTHER PUBLICATIONS

Kurteck, S., Xie, Q., Samir C., and Canis M., "Statistical model for simulation of deformable elastic endometrial tissue shapes." Neurocomputing, vol. 173, pp. 36-41. (Year: 2016).*
Samir C., Kurtek, S., Srivastava A. and Canis M., "Elastic Shape Analysis of Cylindrical Surfaces for 3D/2D Registration in Endometrial Tissue Characterization," in IEEE Transactions on Medical Imaging, vol. 33, No. 5, pp. 1035-1043 (Year: 2014).*
"HS40," Samsung Healthcare Website, Available Online at https://samsunghealthcare.com/en/products/UltrasoundSystem/HS40/Obstetrics%20-%20Gynecology/benefit, Available as Early as Apr. 13, 2021, 16 pages.
"Method and System for Enhanced Visualization of Fibroids With Respect to a Uterus and Endometrium in Ultrasound Imaging," GE Healthcare, Available as Early as Jul. 10, 2023, 57 pages.
Kurtek, S. et al., "Statistical Shape Model for Simulation of Realistic Endometrial Tissue," Proceedings of the 3rd International Conference on Pattern Recognition Applications and Methods (ICPRAM-2014), Mar. 6, 2014, Setubal, Portugal, 16 pages.

* cited by examiner

Primary Examiner — Amal Aly Farag
(74) Attorney, Agent, or Firm — McCoy Russell LLP

(57) ABSTRACT

The current disclosure provides systems and methods for improving a visualization of an image volume of a uterus and/or endometrium of a subject acquired using a transvaginal ultrasound system (TVUS). In one example, a method for the TVUS comprises extracting a medial axis of an endometrium of a received two-dimensional (2D) ultrasound image of a uterus of a subject; generating a uterine trace line based on the extracted medial axis; acquiring a three-dimensional (3D) image volume of the uterus based on the uterine trace line; and displaying the 3D image volume on a display device of the TVUS.

8 Claims, 11 Drawing Sheets

AUTOMATION OF TRANSVAGINAL ULTRASOUND WORKFLOW

TECHNICAL FIELD

Embodiments of the subject matter disclosed herein relate to ultrasound imaging, and more particularly, to systems and methods for automating workflows of ultrasound examinations.

BACKGROUND

Clinical ultrasound is an imaging modality that employs ultrasound waves to probe the internal structures of a body of a patient and produce a corresponding image. An ultrasound probe comprising a plurality of transducer elements emits ultrasonic pulses which reflect or echo, refract, or are absorbed by structures in the body. The ultrasound probe then receives reflected echoes, which are processed into an image. For example, a medical imaging device such as an ultrasound imaging device may be used to obtain images of a heart, uterus, liver, lungs, and various other anatomical regions of a patient. In some applications, such as in transvaginal ultrasound systems (TVUS), the ultrasound probe may be inserted into a cavity of the body.

Classifying uterine activity according to European Society of Human Reproduction and Embryology (ESHRE) and American Society for Reproductive Medicine (ASRM) guidelines is an important step towards uterine health. Classifying uterine activity relies on performing a 3D acquisition along an endometrial region of a uterus of a subject, from a fundus to a cervix of the subject. However, typical acquisitions of uterus and endometrium from 3D TVUS probes may produce image volumes where the endometrial structure does not align well with any of the standard cross-sectional planes of a multi-planar view of the image volume.

SUMMARY

The current disclosure at least partially addresses one or more of the above identified issues by a method for a TVUS, comprising an image processing system including a processor and a non-transitory memory storing instructions that when executed, cause the processor to display a three-dimensional (3D) ultrasound image volume of a uterus of a subject of scan performed using the TVUS on a display device of the TVUS such that an endometrium of the uterus is aligned with a cross-sectional plane of the 3D ultrasound image volume. The cross-sectional plane may be a mid-sagittal plane of the 3D ultrasound image volume. In a first embodiment, a medial axis of the endometrium is extracted from a two-dimensional (2D) ultrasound image of the uterus generated from a prior 2D scan of the uterus, and used to generate a uterine trace line. The 3D image volume of the uterus is then generated with the endometrium aligned with the cross-sectional plane of the 3D image volume based on the uterine trace line. In a second embodiment, a segmentation of the endometrium of the 3D ultrasound image volume is performed, and the 3D ultrasound image volume is then rotated using a rotation vector estimated based on a set of eigenvectors of the segmented endometrium, to align a major axis of the segmented endometrium with the cross-sectional plane of the 3D ultrasound image volume.

The above advantages and other advantages, and features of the present description will be readily apparent from the following Detailed Description when taken alone or in connection with the accompanying drawings. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

Various aspects of this disclosure may be better understood upon reading the following detailed description and upon reference to the drawings in which.

Figure 1:
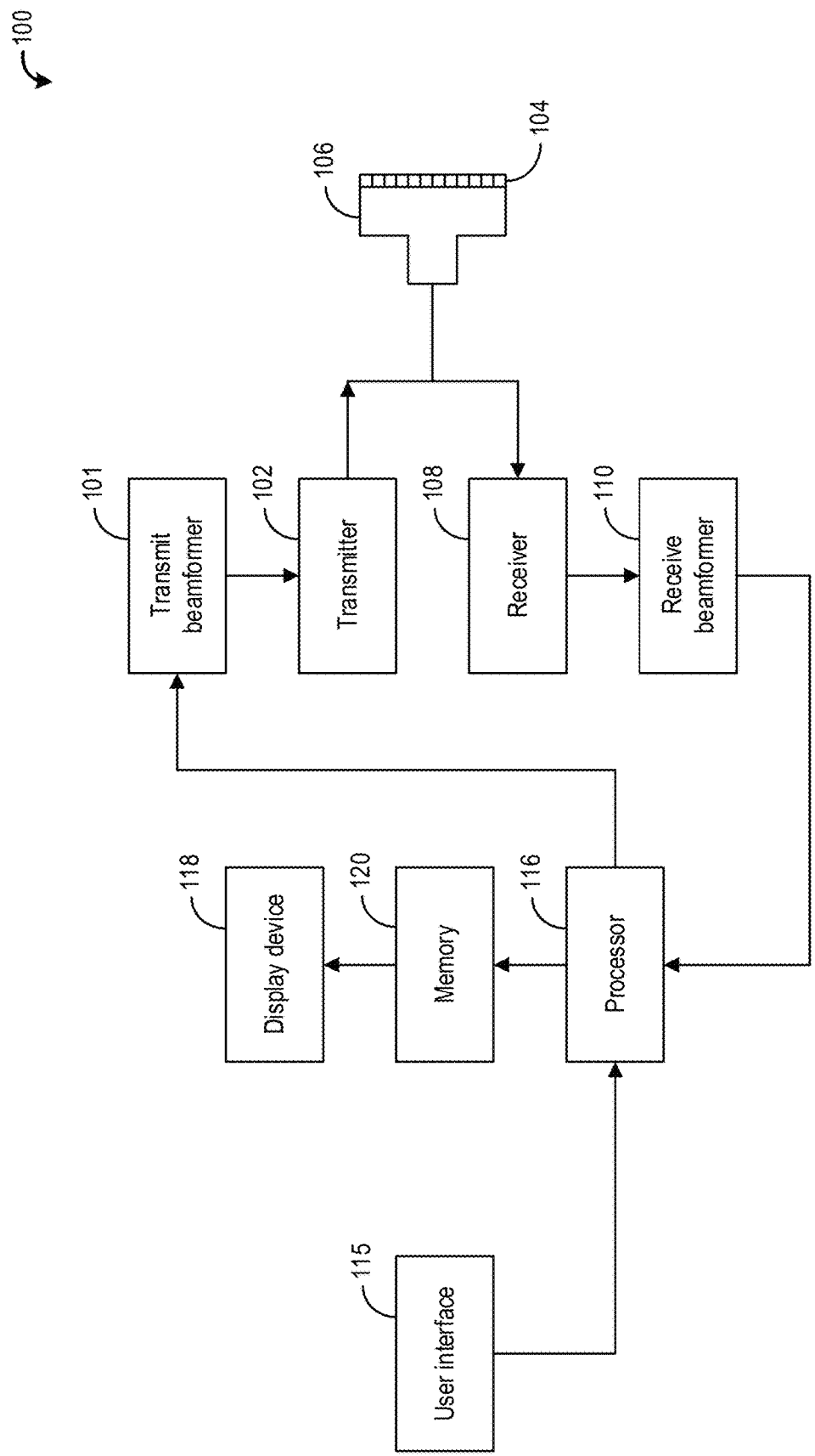
FIG. 1 shows a block diagram of an exemplary embodiment of an ultrasound system.

The drawings illustrate specific aspects of the described systems and methods for mapping one or more ultrasound images in a first resolution to one or more corresponding ultrasound images in a target resolution using generative neural networks. Together with the following description, the drawings demonstrate and explain the structures, methods, and principles described herein. In the drawings, the size of components may be exaggerated or otherwise modified for clarity. Well-known structures, materials, or operations are not shown or described in detail to avoid obscuring aspects of the described components, systems, and methods.

DETAILED DESCRIPTION

Methods and systems are described for improving a visualization of an image volume of a uterus and/or endometrium of a subject acquired using a transvaginal ultrasound system (TVUS). One problem with visualizing such image volumes is that the endometrium may not align well with any of the standard cross-sectional planes of a multi-planar view of the image volume on a display device of the TVUS. As a result, a manual workflow is typically followed to adjust an alignment of the endometrium with a selected cross-sectional plane of the image volume. The cross-sectional planes may be referred to as A, B, and C planes with respect to an anatomy of the subject.

In a first example of a manual workflow, an initial scan may be performed using a two-dimensional (2D) ultrasound probe. A uterine trace line, also referred to as an omni-view line, may be manually drawn on a 2D image reconstructed from the scan by a user of the TVUS. A 3D acquisition may then be performed using the uterine trace line as a guide, to ensure alignment of the endometrium with a cross-sectional plane of a resulting image volume, such as a mid-sagittal plane. If the endometrium is not aligned with the cross-sectional plane, it may not be possible to measure dimensions of the endometrium (e.g., volume, diameter, etc.).

However, this manual workflow has several drawbacks. First, performing a first 2D scan followed by a manual step to generate the 3D image volume in an appropriate orientation may increase an amount of time spent by a user of the ultrasound system, and may increase a use of resources of the ultrasound system, resulting in a corresponding decrease in availability of the resources for other tasks, all of which may increase a cost of operating the ultrasound system. Additionally, the endometrium may be hard to see, as a lesion or uterine abnormality may distort an appearance of the endometrium and/or surrounding features. As a result, a precision with which the uterus/endometrium is aligned with the cross-sectional plane may depend on an experience level of the user, where an inexperienced user may attempt to redraw the uterine trace line various times and perform various scans to achieve the desired alignment, further increasing resource use and costs. A learning curve of the user in drawing the uterine trace line accurately may be slow, due to the fluctuations in size and shape of anatomical features of the uterus over a menstrual cycle.

In a second example of a manual workflow, a 3D TVUS acquisition may be performed without any pre-scanning, to generate the 3D image volume. Without the pre-scanning, the endometrium may not be present in the mid-sagittal plane. To bring the endometrium into the mid-sagittal plane, a z-plane rotational technique may be manually performed by the user. However, rotating the image volume to achieve the desired alignment may be difficult and may rely on user experience, for the reasons described above. Often, the user may rotate the image volume back and forth multiple times to align the endometrium, increasing an amount of time spent by the user reviewing the ultrasound image and the use of the resources of the ultrasound system (e.g., memory, processing power, etc.)

Thus, in both of the first and second example workflows described above, one or more manual steps may be performed, which may be time consuming and/or cumbersome, leading to increased use of the TVUS system and a reduction in an availability of the TVUS system. To address this, methods are proposed to automate these workflows, such that 3D image volumes may be displayed on a display device of the TVUS system with the endometrium aligned with the mid-sagittal plane, without involving manual intervention.

Figure 5:
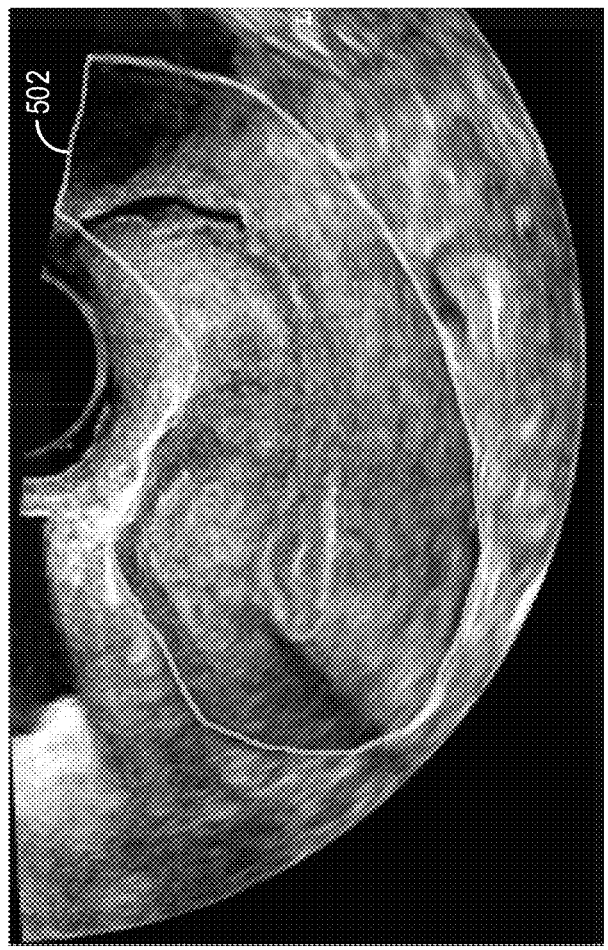
FIG. 5 shows an exemplary segmentation of a uterus in a 2D ultrasound image.
Figure 6:
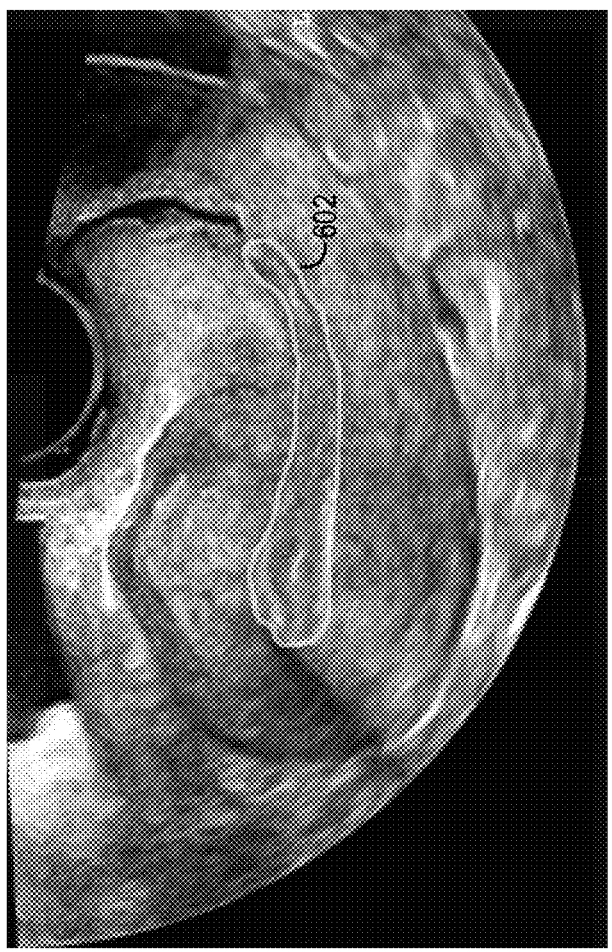
FIG. 6 shows an exemplary segmentation of an endometrium in a 2D ultrasound image.
Figure 7:
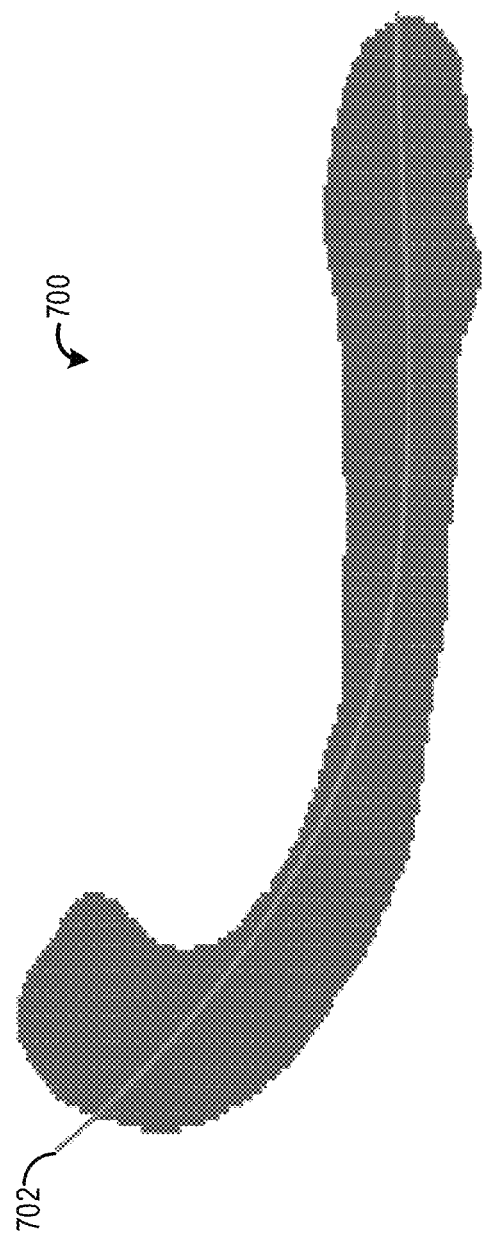
FIG. 7 shows an exemplary medial axis of an endometrium.
Figure 8:
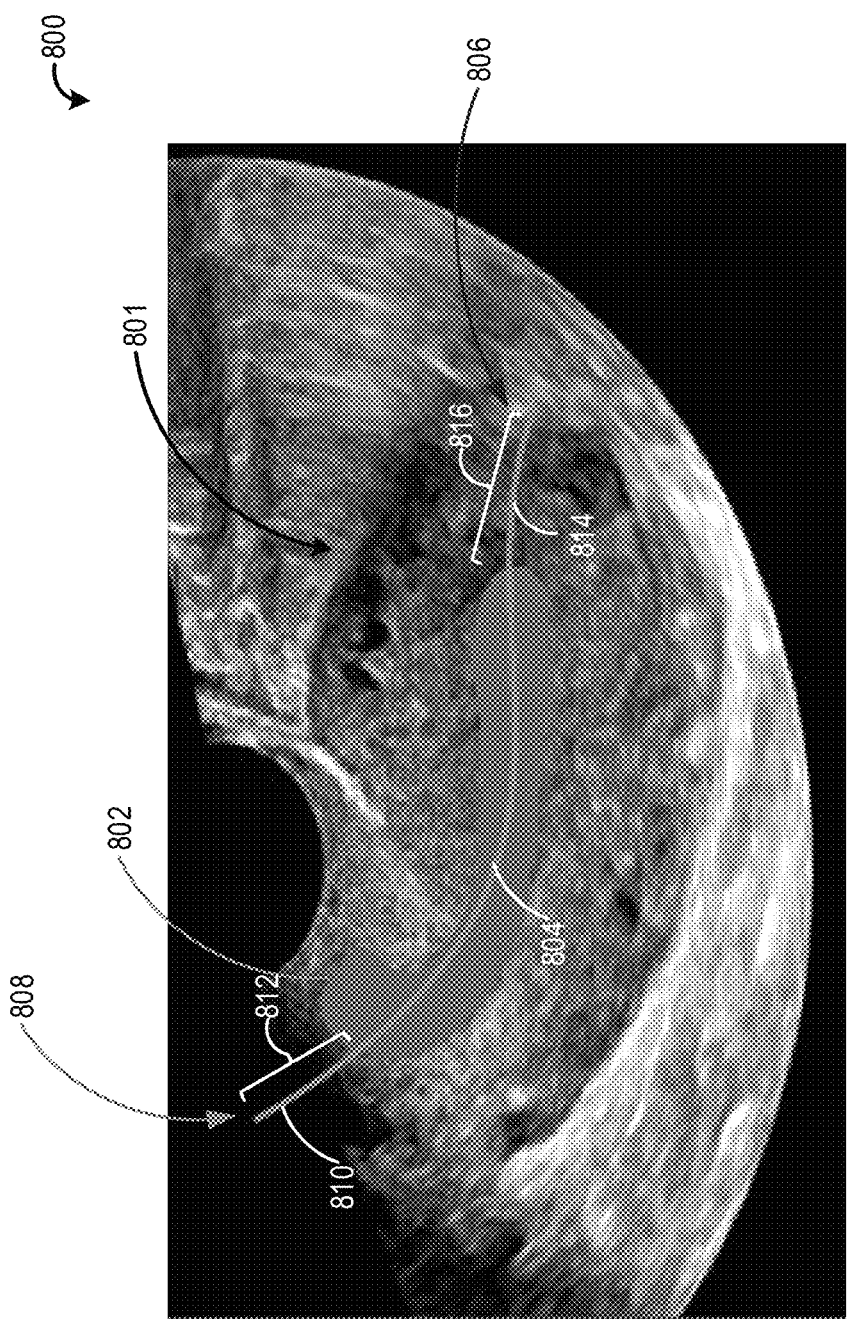
FIG. 8 shows an exemplary extrapolation of the medial axis of the endometrium across a uterus.
Figure 9:
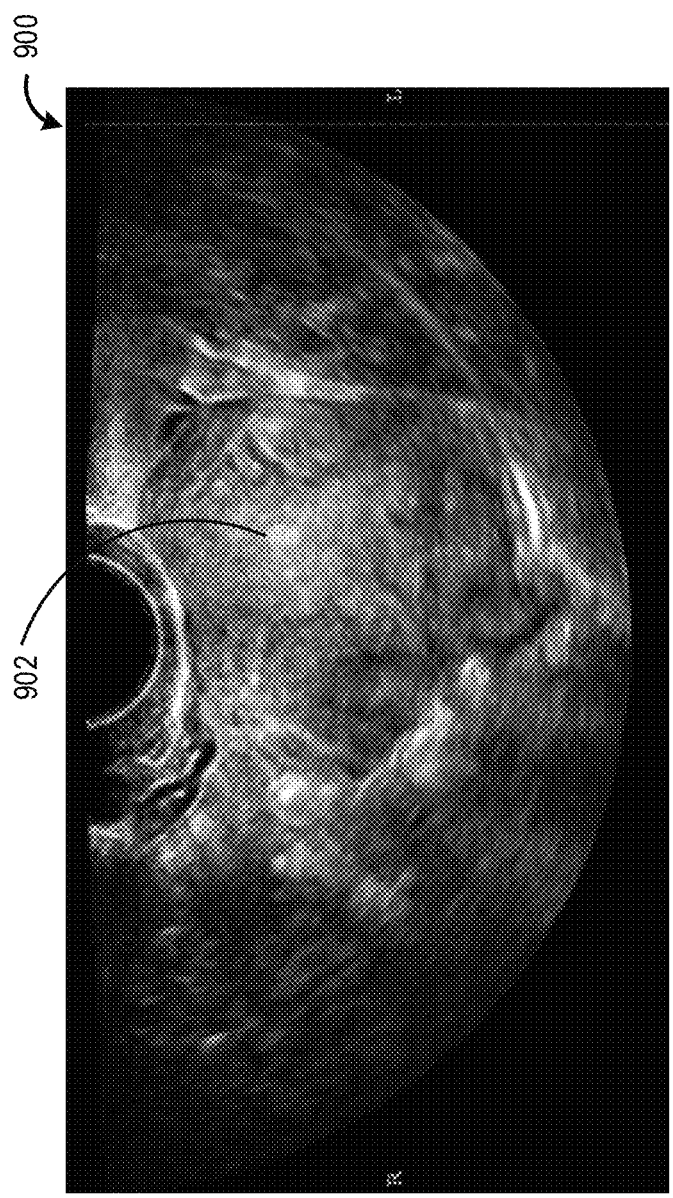
FIG. 9 is a first 2D ultrasound image showing an endometrium not in alignment with a standard cross-sectional plane of an image volume, as prior art.

In various embodiments, an image volume may be acquired via an ultrasound probe of an ultrasound imaging system, such as the ultrasound imaging system of FIG. 1. The ultrasound system may be a TVUS. The ultrasound imaging system may be communicatively coupled to an image processing system, such as image processing system 202 of FIG. 2. A first method for automating a first workflow for displaying the image volume is described in reference to FIG. 3, and a second method for automating a second workflow for displaying the image volume is described in reference to FIG. 4. Either or both of the first and second workflows may include performing a segmentation of a uterus of a subject included in the image volume, as shown in FIG. 5, and performing a segmentation of an endometrium of the subject included in the image volume, as shown in FIG. 6. A uterine trace line used to align the image volume on a display screen of the TVUS may be generated by fitting a polynomial function to an extracted medial axis of the endometrium, as shown in FIG. 7. The uterine trace line generated from the endometrium may be extrapolated to span the uterus, as shown in FIG. 8. The image volume may then be rotated, based on the uterine trace line, to display the endometrium in alignment with a mid-sagittal plane of the TVOS, as shown in FIG. 9.

Referring now to FIG. 1, a schematic diagram of an ultrasound imaging system 100 in accordance with an embodiment of the disclosure is shown. The ultrasound imaging system 100 includes a transmit beamformer 101 and a transmitter 102 that drives elements (e.g., transducer elements) 104 within a transducer array, herein referred to as probe 106, to emit pulsed ultrasonic signals (referred to herein as transmit pulses) into a body (not shown). The probe 106 may be a one-dimensional transducer array probe, or the probe 106 may be a two-dimensional matrix transducer array probe. As explained further below, the transducer elements 104 may be comprised of a piezoelectric material. When a voltage is applied to a piezoelectric crystal, the crystal physically expands and contracts, emitting an ultrasonic spherical wave. In this way, transducer elements 104 may convert electronic transmit signals into acoustic transmit beams.

After the elements 104 of the probe 106 emit pulsed ultrasonic signals into a body (of a patient), the pulsed ultrasonic signals are back-scattered from structures within an interior of the body, like blood cells or muscular tissue, to produce echoes that return to the elements 104. The echoes are converted into electrical signals, or ultrasound data, by the elements 104 and the electrical signals are received by a receiver 108. The electrical signals representing the received echoes are passed through a receive beamformer 110 that outputs ultrasound data. Additionally, transducer element 104 may produce one or more ultrasonic pulses to form one or more transmit beams in accordance with the received echoes.

According to some embodiments, the probe 106 may contain electronic circuitry to do all or part of the transmit beamforming and/or the receive beamforming. For example, all or part of the transmit beamformer 101, the transmitter 102, the receiver 108, and the receive beamformer 110 may be situated within the probe 106. The terms "scan" or "scanning" may also be used in this disclosure to refer to acquiring data through the process of transmitting and receiving ultrasonic signals. The term "data" may be used in this disclosure to refer to either one or more datasets acquired with an ultrasound imaging system. In one embodiment, data acquired via ultrasound system 100 may be used to train a machine learning model. A user interface 115 may be used to control operation of the ultrasound imaging system 100, including to control the input of patient data (e.g., patient clinical history), to change a scanning or display parameter, to initiate a probe repolarization sequence, and the like. The user interface 115 may include one or more of the following: a rotary element, a mouse, a keyboard, a trackball, hard keys linked to specific actions, soft keys that may be configured to control different functions, and/or a graphical user interface displayed on a display device 118.

The ultrasound imaging system 100 also includes a processor 116 to control the transmit beamformer 101, the transmitter 102, the receiver 108, and the receive beamformer 110. The processor 116 is in electronic communication (e.g., communicatively connected) with the probe 106. For purposes of this disclosure, the term "electronic communication" may be defined to include both wired and wireless communications.

The processor 116 may control the probe 106 to acquire data according to instructions stored on a memory of the processor, and/or memory 120. The processor 116 may control which of the elements 104 are active and the shape of a beam emitted from the probe 106. The processor 116 is also in electronic communication with the display device 118, and the processor 116 may process the data (e.g., ultrasound data) into images for display on the display device 118. The processor 116 may include a central processor (CPU), according to an embodiment. According to other embodiments, the processor 116 may include other electronic components capable of carrying out processing functions, such as a digital signal processor, a field-programmable gate array (FPGA), or a graphic board. According to other embodiments, the processor 116 may include multiple electronic components capable of carrying out processing functions. For example, the processor 116 may include two or more electronic components selected from a list of electronic components including: a central processor, a digital signal processor, a field-programmable gate array, and a graphic board. According to another embodiment, the processor 116 may also include a complex demodulator (not shown) that demodulates the RF data and generates raw data. In another embodiment, the demodulation can be carried out earlier in the processing chain.

The processor 116 is adapted to perform one or more processing operations according to a plurality of selectable ultrasound modalities on the data. In one example, the data may be processed in real-time during a scanning session as the echo signals are received by receiver 108 and transmitted to processor 116. For the purposes of this disclosure, the term "real-time" is defined to include a procedure that is performed without any intentional delay. For example, an embodiment may acquire images at a real-time frame-rate of 7-20 frames/sec. The ultrasound imaging system 100 may acquire 2D data of one or more planes at a significantly faster rate. However, it should be understood that the real-time frame-rate may be dependent on a length of time that it takes to acquire each frame of data for display. Accordingly, when acquiring a relatively large amount of data, the real-time frame-rate may be slower. Thus, some embodiments may have real-time frame-rates that are considerably faster than 20 frames/sec while other embodiments may have real-time frame-rates slower than 7 frames/sec.

The data may be stored temporarily in a buffer (not shown) during a scanning session and processed in less than real-time in a live or off-line operation. In some embodiments, multiple processors (not shown) may be included to handle the processing tasks that are handled by processor 116 according to the exemplary embodiment described hereinabove. For example, a first processor may be utilized to demodulate and decimate the RF signal while a second processor may be used to further process the data, for example by augmenting the data as described further herein, prior to displaying an image. It should be appreciated that other embodiments may use a different arrangement of processors.

The ultrasound imaging system 100 may continuously acquire data at a frame-rate of, for example, 10 Hz to 30 Hz (e.g., 10 to 30 frames per second). Images generated from the data may be refreshed at a similar frame-rate on display device 118. Other embodiments may acquire and display data at different rates. For example, some embodiments may acquire data at a frame-rate of less than 10 Hz or greater than 30 Hz depending on the size of the frame and the intended application. A memory 120 is included for storing processed frames of acquired data. In an exemplary embodiment, the memory 120 is of sufficient capacity to store at least several seconds' worth of frames of ultrasound data. The frames of data are stored in a manner to facilitate retrieval thereof according to its order or time of acquisition. The memory 120 may comprise any known data storage medium.

In various embodiments of the present invention, data may be processed in different mode-related modules by the processor 116 (e.g., B-mode, Color Doppler, M-mode, Color M-mode, spectral Doppler, Elastography, TVI, strain, strain rate, and the like) to form 2D or 3D data. For example, one or more modules may generate B-mode, color Doppler, M-mode, color M-mode, spectral Doppler, Elastography, TVI, strain, strain rate, and combinations thereof, and the like. As one example, the one or more modules may process color Doppler data, which may include traditional color flow Doppler, power Doppler, HD flow, and the like. The image lines and/or frames are stored in memory and may include timing information indicating a time at which the image lines and/or frames were stored in memory. The modules may include, for example, a scan conversion module to perform scan conversion operations to convert the acquired images from beam space coordinates to display space coordinates. A video processor module may be provided that reads the acquired images from a memory and displays an image in real time while a procedure (e.g., ultrasound imaging) is being performed on a patient. The video processor module may include a separate image memory, and the ultrasound images may be written to the image memory in order to be read and displayed by display device 118.

In various embodiments of the present disclosure, one or more components of ultrasound imaging system 100 may be included in a portable, handheld ultrasound imaging device. For example, display device 118 and user interface 115 may be integrated into an exterior surface of the handheld ultrasound imaging device, which may further contain processor 116 and memory 120. Probe 106 may comprise a handheld probe in electronic communication with the handheld ultrasound imaging device to collect raw ultrasound data. Transmit beamformer 101, transmitter 102, receiver 108, and receive beamformer 110 may be included in the same or different portions of the ultrasound imaging system 100. For example, transmit beamformer 101, transmitter 102, receiver 108, and receive beamformer 110 may be included in the handheld ultrasound imaging device, the probe, and combinations thereof.

After performing an ultrasound scan, a two-dimensional block of data comprising scan lines and their samples is generated for each row of transducers comprised by the ultrasound probe (e.g., one block of data for a 1D probe, or n blocks of data for a 2D probe with n rows of transducers). After back-end filters are applied, a process known as scan conversion is performed to transform the two-dimensional data block into a displayable bitmap image with additional scan information such as depths, angles of each scan line, and so on. During scan conversion, an interpolation technique is applied to fill missing holes (e.g., pixels) in the resulting image. These missing pixels occur because each element of the two-dimensional block should typically cover many pixels in the resulting image. For example, in current ultrasound imaging systems, a bicubic interpolation is applied which leverages neighboring elements of the two-dimensional block. As a result, if the two-dimensional block is relatively small in comparison to the size of the bitmap image, the scan-converted image will include areas of poor or low resolution, especially for areas of greater depth.

Ultrasound images acquired by ultrasound imaging system 100 may be further processed. In some embodiments, as described in greater detail below, ultrasound images produced by ultrasound imaging system 100 may be transmitted to an image processing system, where the ultrasound images may be processed by one or more machine learning (ML) models.

Although described herein as separate systems, it will be appreciated that in some embodiments, ultrasound imaging system 100 includes an image processing system. In other embodiments, ultrasound imaging system 100 and the image processing system may comprise separate devices. In some embodiments, images produced by ultrasound imaging system 100 may be used as a training data set for training one or more machine learning models, wherein the machine learning models may be used to perform one or more steps of ultrasound image processing, as described below.

Figure 2:
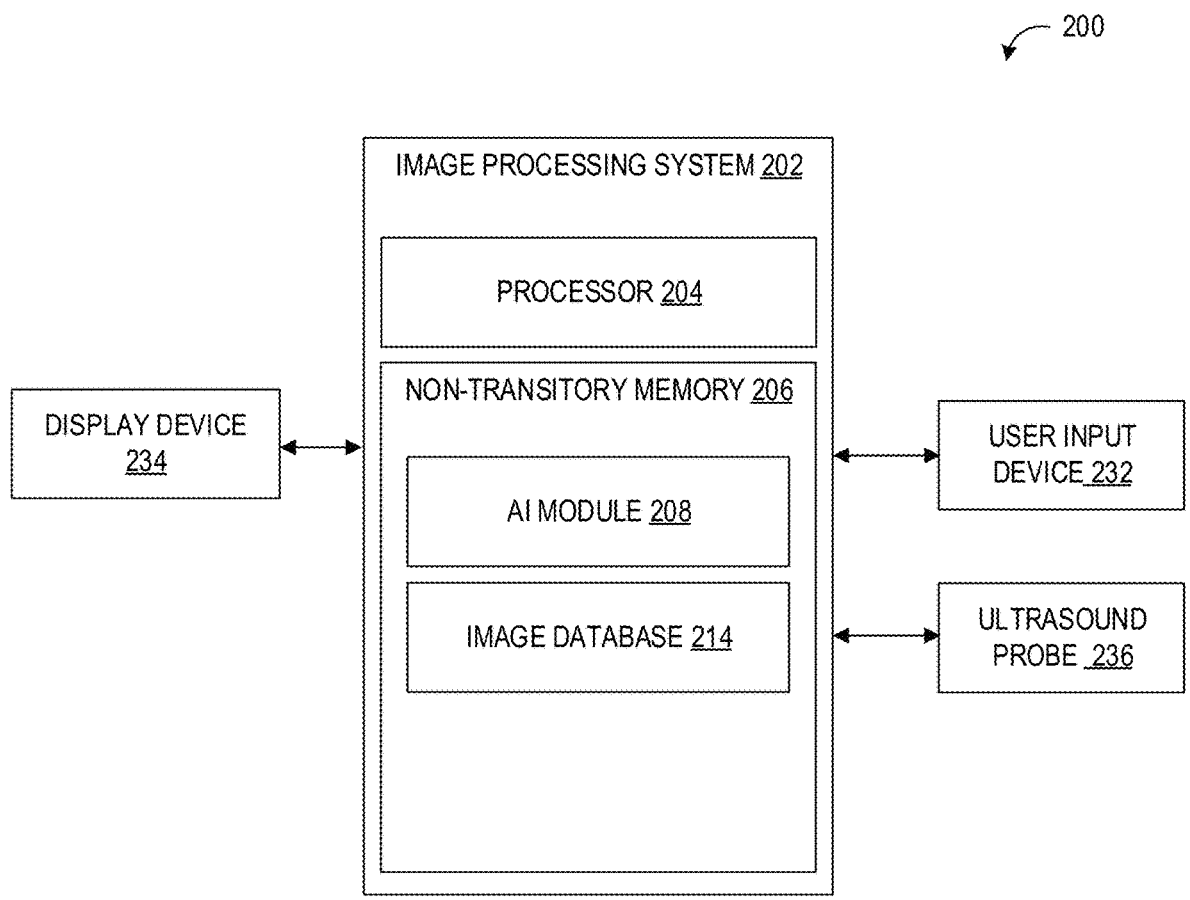
FIG. 2 shows a block diagram of an exemplary embodiment of an image processing system.

Referring to FIG. 2, a block diagram 200 shows an image processing system 202, in accordance with an embodiment. In some embodiments, image processing system 202 is incorporated into the ultrasound imaging system 100. For example, image processing system 202 may be provided in the ultrasound imaging system 100 as the processor 116 and memory 120. In some embodiments, at least a portion of image processing 202 is disposed at a device (e.g., edge device, server, etc.) communicably coupled to the ultrasound imaging system via wired and/or wireless connections. In some embodiments, at least a portion of image processing system 202 is disposed at a separate device (e.g., a workstation) which can receive images from the ultrasound imaging system or from a storage device which stores the images/data generated by the ultrasound imaging system. Image processing system 202 may be operably/communicatively coupled to a user input device 232 and a display device 234. User input device 232 may comprise the user interface 115 of the ultrasound imaging system 100, while display device 234 may comprise the display device 118 of the ultrasound imaging system 100, at least in some examples. Image processing system 202 may also be operably/communicatively coupled to an ultrasound probe 236.

Image processing system 202 includes a processor 204 configured to execute machine readable instructions stored in non-transitory memory 206. Processor 204 may be single core or multi-core, and the programs executed thereon may be configured for parallel or distributed processing. In some embodiments, processor 204 may optionally include individual components that are distributed throughout two or more devices, which may be remotely located and/or configured for coordinated processing. In some embodiments, one or more aspects of processor 204 may be virtualized and executed by remotely-accessible networked computing devices configured in a cloud computing configuration.

Non-transitory memory 206 may store an artificial intelligence (AI) module 208, a segmentation module 210, and an image database 214. AI module 208 may include one or more rules-based systems and/or machine learning models (e.g., neural networks), and instructions for implementing the systems or ML models to calculate a desired rotation and/or alignment of a 3D image volume on a display device 234 of the ultrasound system, as described in greater detail below. AI module 208 may include trained and/or untrained neural networks and may further include various data, or metadata pertaining to the one or more neural networks stored therein. In some embodiments, AI module 208 may include instructions for implementing one or more gradient descent algorithms, applying one or more loss functions, and/or training routines, for use in adjusting parameters of one or more neural networks of AI module 208. AI module 208 may include training datasets for the one or more neural networks of AI module 208. Additionally, AI module 208 may include other types of models, such as statistical, probabilistic, and/or mathematical models.

In particular, AI module 208 may store one or more ML segmentation models used to perform a segmentation of anatomical features of an ultrasound image. The one or more ML segmentation models may include 2D segmentation models and 3D segmentations models. For example, a first segmentation model may be used to segment an endometrium and/or a uterus of a subject in a 2D ultrasound image, as described below in reference to FIGS. 5 and 6. A second, 3D segmentation model may be used to segment an endometrium of a 3D image volume, as described below in reference to FIG. 4.

Image database 214 may include ultrasound images acquired via an ultrasound probe, including 2D and 3D images.

In some embodiments, non-transitory memory 206 may include components disposed at two or more devices, which may be remotely located and/or configured for coordinated processing. In some embodiments, one or more aspects of non-transitory memory 206 may include remotely-accessible networked storage devices configured in a cloud computing configuration.

Display device 234 may include one or more display devices utilizing virtually any type of technology. In some embodiments, display device 234 may comprise a computer monitor, and may display ultrasound images. Display device 234 may be combined with processor 204, non-transitory memory 206, and/or user input device 232 in a shared enclosure, or may be peripheral display devices and may comprise a monitor, touchscreen, projector, or other display device known in the art, which may enable a user to view ultrasound images produced by an ultrasound imaging system, and/or interact with various data stored in non-transitory memory 206.

User input device 232 may comprise one or more of a touchscreen, a keyboard, a mouse, a trackpad, a motion sensing camera, or other device configured to enable a user to interact with and manipulate data within image processing system 202. In one example, user input device 232 may enable a user to draw a uterine trace line on a 2D ultrasound image of a uterus. The uterine trace line may be used to align an endometrium of the uterus with a cross-sectional plane of a 3D image volume including the uterus on display device 234.

It should be understood that image processing system 202 shown in FIG. 2 is for illustration, not for limitation. Another appropriate image processing system may include more, fewer, or different components.

Figure 3:
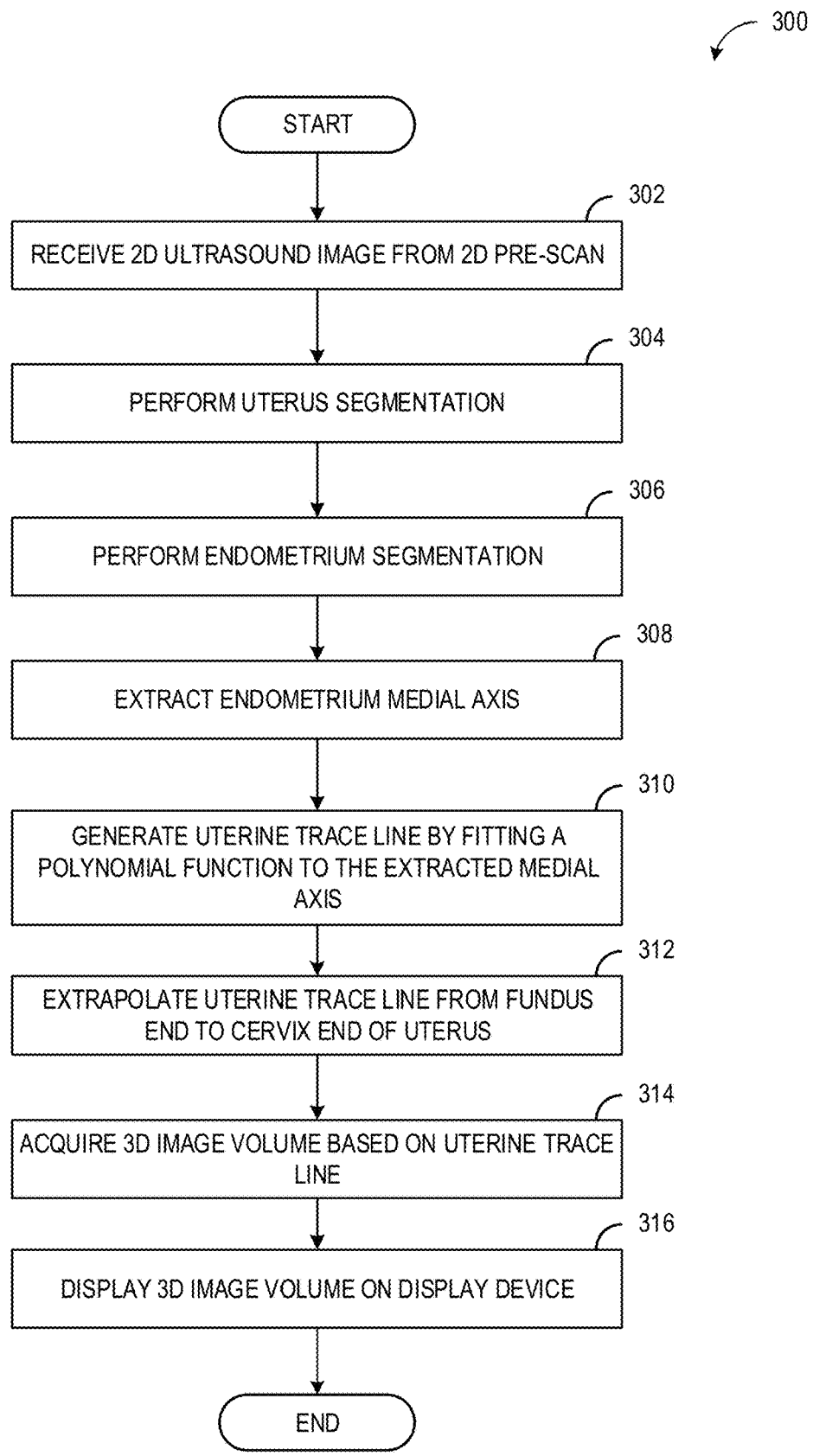
FIG. 3 is a flowchart illustrating an exemplary procedure for automating a first workflow for acquiring an image volume of a uterus using a TVUS.

Referring now to FIG. 3, an exemplary method 300 is shown for automating a first workflow followed by a user of an ultrasound system for aligning an image volume on a display device of the ultrasound system, such that anatomical features of a patient are displayed in a standard cross-sectional plane of the image volume. For example, the cross-sectional plane may be a mid-sagittal plane of the image volume. The ultrasound system may be a TVUS, and the anatomical features may include a uterus and/or an endometrium of the patient. Method 300 may be executed by a processor (e.g., processor 204) of an image processing system coupled to the ultrasound system, such as image processing system 202 of FIG. 2, based on instructions stored in a memory of the image processing system (e.g., memory 206).

Method 300 begins at 302, where the method includes receiving a 2D ultrasound image acquired from a 2D pre-scan of a patient using the TVUS. The 2D ultrasound image may be acquired via an ultrasound probe of the ultrasound system, where the ultrasound probe is configured in a 2D mode. The ultrasound image may include the uterus of the patient. The pre-scan may be used to determine an alignment of an endometrium of the patient, so that a second, 3D ultrasound scan may be performed using a configuration of the ultrasound probe in a 3D mode that will generate an image volume with the endometrium aligned with a standard cross-sectional plane of the image volume.

Figure 10:
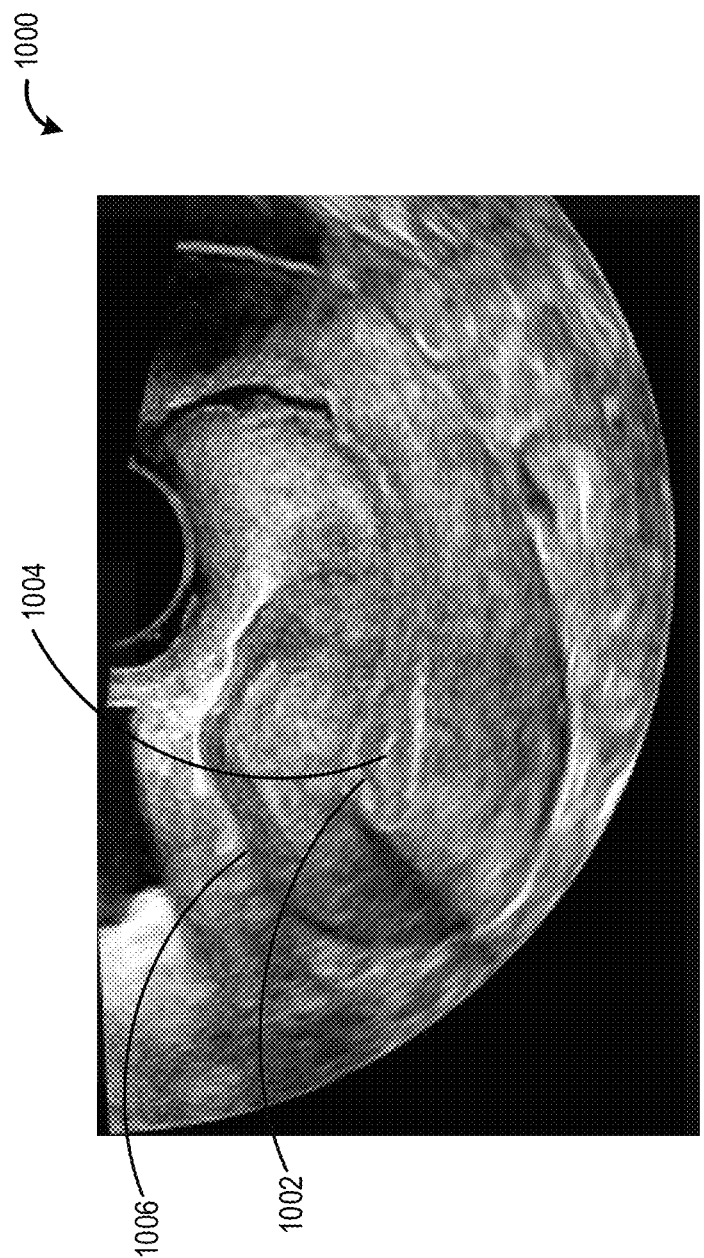
FIG. 10 is a second 2D ultrasound image showing an endometrium in alignment with a standard cross-sectional plane of an image volume, as prior art.

As an example, FIG. 9 shows a first 2D ultrasound image 900 including an endometrium 902, where endometrium 902 is not aligned with a standard cross-sectional plane of the image volume. In first 2D ultrasound image 900, endometrium 902 appears as a small oblong shape, where an extent of endometrium 902 is not visible and various features and/or characteristics of the endometrium cannot be seen. In contrast, FIG. 10 shows a second 2D ultrasound image 1000 including an endometrium 1002, where endometrium 1002 is aligned with the mid-sagittal plane of the image volume. In second 2D ultrasound image 1000, endometrium 1002 is shown in a side perspective, where an extent of endometrium 1002 can be seen along with features and/or characteristics of endometrium 1002 visible from the side perspective, such as a medial axis 1004 of endometrium 1002. Additionally, a shape of a uterus 1006 and an alignment of endometrium 1002 with uterus 1006 can be seen.

Returning to method 300, at 304, method 300 includes performing a segmentation of the uterus. In various embodiments, the segmentation of the uterus may be performed using a segmentation model of the image processing system (e.g., of AI module 208 of FIG. 2).

FIG. 5 shows an exemplary ultrasound image 500 including a segmented uterus 502. In various embodiments, the uterus may be segmented using a convolutional neural network (CNN) trained to mark the uterus and endometrium. The CNN may have an architecture such as UNet, MaskRCNN, etc.

At 306, method 300 includes performing a segmentation of an endometrium of the uterus, using the segmentation model. FIG. 6 shows an exemplary ultrasound image 600 including a segmented uterus 602.

At 308, method 300 includes extracting a medial axis of the segmented endometrium. Extracting the medial axis may rely on a morphological thinning process that successively erodes away pixels from a boundary of the segmented endometrium, while preserving end points of line segments of the boundary, until no more thinning is possible, at which point what is left approximates the medial axis. The medial axis may comprise a collection of points extending through a middle portion of the segmented endometrium.

At 310, method 300 includes generating a uterine trace line by fitting a polynomial function to the extracted medial axis. Referring briefly to FIG. 7, an exemplary representation of an endometrium 700 is shown, where an exemplary uterine trace line 702 is generated by fitting a polynomial function to the collection of points establishing the medial axis and drawn on the endometrium 700.

At 312, method 300 includes extrapolating the uterine trace line to span the uterus, from a fundus end of the uterus, to a cervix end of the uterus. In other words, the uterine trace line defines a major axis of the uterus, where it is desirable to display the uterus with the major axis aligned with a cross-sectional plane of the 3D image volume of the uterus in a multi-planar view on a display device. The endometrium may be used as a guide for generating the uterine trace line, due to a positioning of the endometrium along the major axis of the uterus. However, the endometrium may not span a full length of the uterus along the major axis. Thus, to generate a full uterine trace line, the (initial) uterine trace line generated from the extracted medial axis of the endometrium may be extrapolated, based on the polynomial fit, to extend from a fundus of the patient positioned at a first end of the uterus, to a cervix of the patient positioned at a second end of the uterus.

An exemplary extrapolated uterine trace line is shown in FIG. 8. Referring to FIG. 8, a 2D ultrasound image 800 is shown, including a uterus 801. The view of 2D ultrasound image 800 corresponds to a mid-sagittal plane of a 3D image volume including 2D ultrasound image 800. In FIG. 8, uterus 801 is not aligned with the mid-sagittal plane. A first end 806 of uterus 801 is shown, but a second end 808 of uterus 801 is not visible. As a result of the second end 808 not being visible and uterus 801 not being centered, reliable measurements of uterus 801 may not be possible (e.g., volume, etc.) To view the entire uterus 801, the image volume may be rotated in a subsequent 3D acquisition, where a rotation performed may be based on a uterine trace line 804 of 2D ultrasound image 800. Uterine trace line 804 may be generated by fitting a polynomial function to a medial axis of an endometrium 802, as described above in method 300 of FIG. 3.

However, to accurately position endometrium 802 and uterus 801 in a center of the mid-sagittal plane, uterine trace line 804 is extrapolated to span uterus 801 from first end 806 (e.g., a fundus end of uterus 801) to second end 808 (e.g., a cervix end of uterus 801). To extrapolate uterine trace line 804, the polynomial function used to fit the medial axis is used to generate a first extended portion 814 of uterine trace line 804 to first end 806 (e.g., the cervix), and to generate a second extended portion 810 of uterine trace line 804 to second end 808 (e.g., the fundus). Extended portion 814 has a length 816 from a first end of endometrium 802 to first end 806 of uterus 801, and extended portion 810 has a length 812 from a second end of endometrium 802 to second end 808 of uterus 801.

Returning to method 300, at 314, method 300 includes acquiring a 3D image volume based on the extrapolated uterine trace line. The 3D acquisition may be automatically performed once the trace line is drawn. Users acquire the endometrial plane while scanning, and the uterine trace line is drawn passing medially through the endometrium, from the cervix to the fundus. The uterine trace ensures that the cervix, fundus, and endometrium are clearly visible. Once the trace line is drawn, a 3D acquisition is triggered to ensure that the image on which the uterine trace is drawn is in the mid-sagittal plane. For example, a mechanical 3D probe may scan from approximately −45° to +45°, with a 0th angle corresponding to the plane where uterine trace line is drawn.

At 316, method 300 includes displaying the 3D image volume on a display device of the TVUS, and method 300 ends. When the 3D image volume is displayed on the display device, the endometrium and uterus of the patient (e.g., endometrium 802 and uterus 801 of FIG. 8) may be centered in the mid-sagittal (or other cross-sectional) plane of the 3D image volume.

Figure 4:
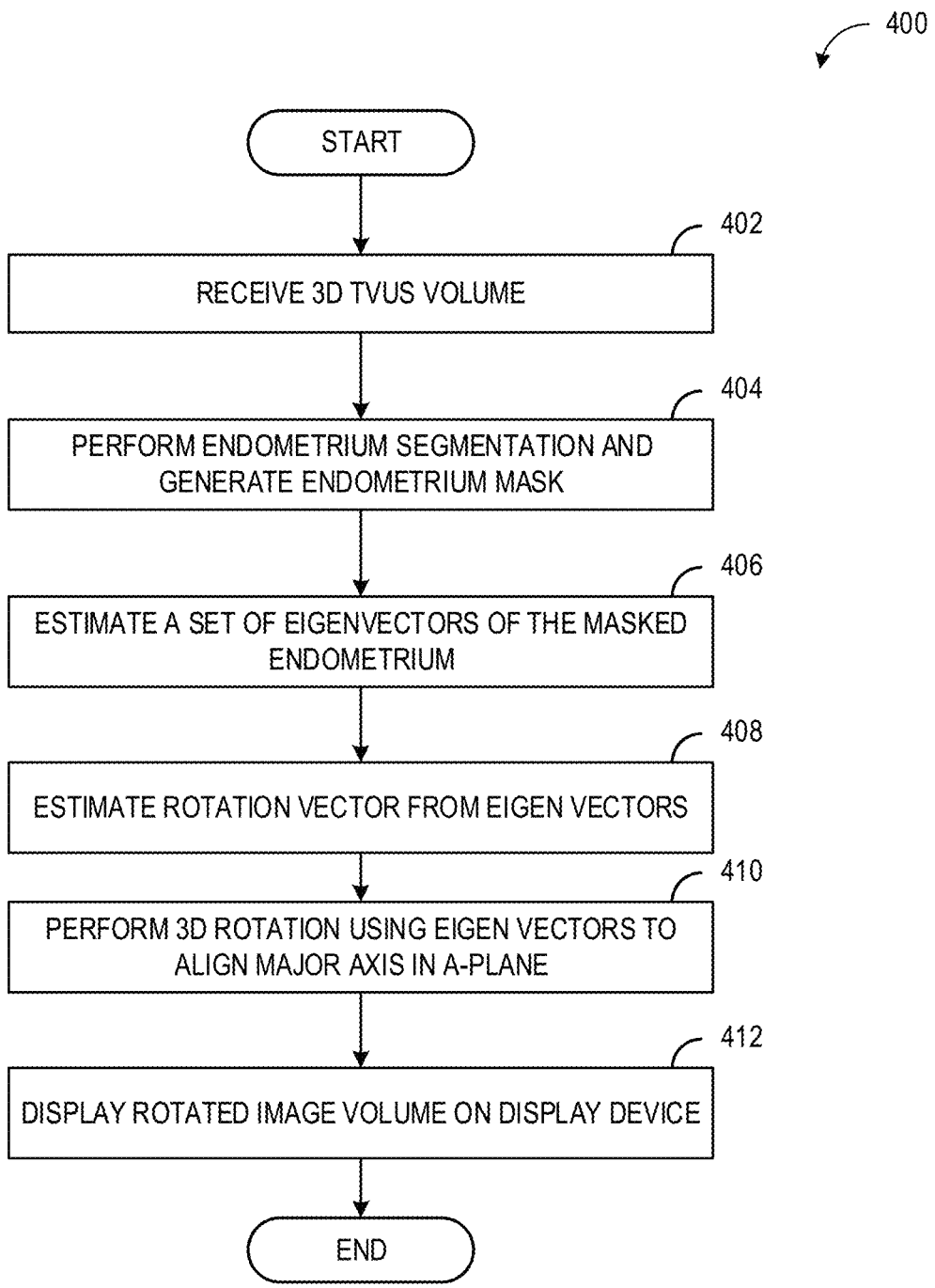
FIG. 4 is a flowchart illustrating an exemplary procedure for automating a second workflow for acquiring an image volume of a uterus.

Referring now to FIG. 4, an exemplary method 400 is shown for automating a second workflow followed by a user of an ultrasound system for aligning an image volume on a display device of the ultrasound system such that anatomical features of a patient are displayed in a standard cross-sectional plane (e.g., a mid-sagittal plane) of an image reviewing application of the ultrasound system used to view the image volume. The ultrasound system may be a TVUS, and the anatomical features may include a uterus and/or an endometrium of the patient. Method 400 may be executed by a processor (e.g., processor 204) of an image processing system coupled to the ultrasound system, such as image processing system 202 of FIG. 2, based on instructions stored in a memory of the image processing system (e.g., memory 206).

Method 400 begins at 402, where the method includes receiving a 3D ultrasound image acquired from a 3D scan of a patient using the TVUS. The ultrasound image may include the uterus of the patient.

At 404, method 400 includes performing a segmentation of an endometrium of the uterus, using a segmentation model as described above in reference to method 300 of FIG. 3. The segmentation model may be stored in a non-transitory memory of the image processing system (e.g., in AI module 208 of non-transitory memory 206 of FIG. 2). The segmentation may then be used to generate a mask for the endometrium, where the mask may be used to generate a masked version of the 3D ultrasound image. The masked version may include image data of the 3D ultrasound image inside the endometrium and exclude image data outside the endometrium. The mask may comprise a 3D matrix of weight values that may be multiplied by image data values of each voxel of the 3D ultrasound image. For example, weight values of the mask assigned to voxels of the 3D ultrasound image outside the endometrium may be 0.0, and weight values of the mask assigned to voxels of the 3D ultrasound image inside the endometrium may be 1.0.

At 406, method 400 includes estimating a set of eigenvectors of the masked endometrium. In a first step, a covariance matrix of the voxel coordinates in 3D space (x, y, z), corresponding to the masked endometrium may be computed. The eigenvalues and eigenvectors of this covariance matrix may then be computed. The eigenvectors may determine principal axes of rotation of the endometrium. For example, a largest eigenvector may align with a longest dimension of the endometrium, corresponding to a major axis of the endometrium. Second and third eigenvectors may align with other minor axes of the endometrium.

Figure 11:
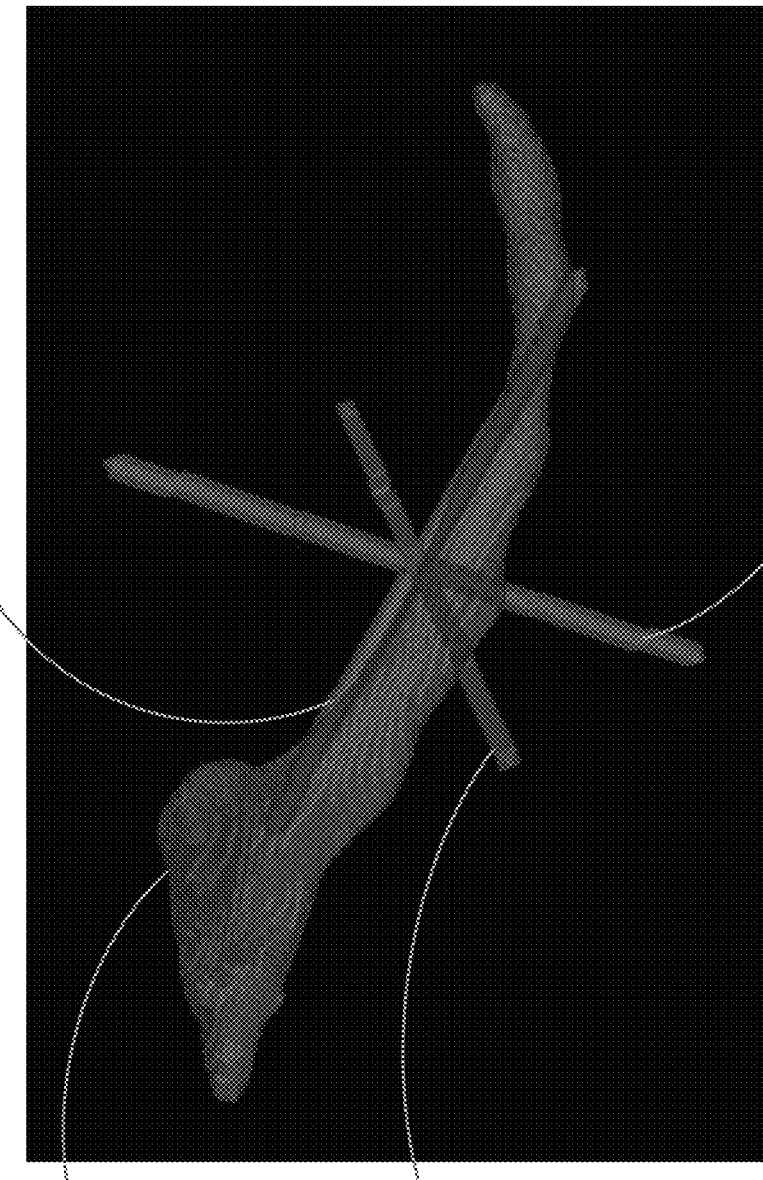
FIG. 11 is a third ultrasound image showing principal axes of an endometrium, in accordance with one or more embodiments of the present disclosure.

Referring briefly to FIG. 11, an ultrasound image 1100 of an endometrium 1102 is shown, where a set of principal axes 1105 of endometrium 1102 are shown superimposed on ultrasound image 1100. A major axis 1104 may correspond to a first, largest eigenvector; a first minor axis 1106 may correspond to a second, smaller eigenvector; and a second minor axis 1108 may correspond to a third, even smaller eigenvector, Distinguishing between the second and third eigenvectors may be complicated due to variations in size and shape of the endometrium over a menstrual cycle of the patient. The principal axes may represent axes around which the endometrium 1102 may be rotated to align the endometrium 1102 with a desired cross-sectional plane for viewing a full extent of the endometrium 1102.

By computing the covariance matrix and the eigenvectors of the masked endometrium rather than the 3D ultrasound image volume, an amount of processing performed during the computation of the eigenvalues and eigenvectors of the covariance matrix may be reduced. As a result, a consumption of computational resources (e.g., processor 116 and memory 120 of FIG. 1) of the ultrasound system may be decreased, increasing a performance and improving a functioning of the ultrasound system.

At 408, method 400 includes estimating a rotation vector based on the estimated set of eigenvectors. The rotation vector may align the major axis of the endometrium characterized by the largest eigenvector with a desired cross-sectional plane of the 3D ultrasound image volume.

At 410, method 400 includes performing a 3D rotation of the 3D ultrasound image volume based on the rotation vector. The volume may be rotated such that the plane described by the largest and the smallest eigenvectors is aligned with the A plane. Predominantly in phase 2 or 3 endometrium, the above the assumption is valid. There can be outliers (phase0& 1) when the above assumptions may not hold, and these can be eliminated based on the detected endometrium volume falling below a particular threshold.

At 412, method 400 includes displaying the rotated 3D ultrasound image volume on a display device of the TVUS, and method 400 ends. When the 3D ultrasound image volume is displayed on the display device, the endometrium and uterus of the patient may be centered in the mid-sagittal (or other cross-sectional) plane of the 3D ultrasound image volume. An example of a 3D ultrasound image volume with an endometrium and uterus centered in the mid-sagittal plane is shown in FIG. 10.

Thus, two methods are proposed for automatically acquiring a 3D ultrasound image volume of a uterus of a patient with a desired alignment of the uterus with a cross-sectional plane of the image volume. In a first method, a uterine trace line is automatically generated on a 2D ultrasound image based on segmenting an endometrium of the uterus, extracting a median axis of the segmented endometrium, and fitting a polynomial function to the extracted median axis. The 3D image volume is then acquired based on the automatically generated uterine trace line. In a second method, a 3D segmentation of the endometrium is performed, and a set of eigenvectors of the segmented endometrium is estimated based on a covariance matrix of pixel coordinates in 3D space corresponding to an endometrium mask. The calculations made to estimate the eigenvectors are advantageously performed on the segmented, masked endometrium, rather than the 3D image volume, to reduce a computational load on the ultrasound system during operation, thereby freeing up resources and increasing an efficiency of the ultrasound system. A rotation vector is then estimated based on the set of eigenvectors, and the 3D image volume is automatically rotated based on the rotation vector such that the 3D image volume is displayed with the uterus aligned with the cross-sectional plane. By using either of the two methods to automatically align the uterus (and/or endometrium) with the cross-sectional plane prior to display, an amount of time spent by a radiologist reading the ultrasound image volume may be reduced. Without using either of the two methods, the radiologist would have to first orient the 3D image volume prior to inspecting structures included within a region of interest of the uterus and/or endometrium. Orienting the 3D image volume may be difficult, where the radiologist may have to adjust the orientation of the 3D image volume various times before achieving a desired orientation. By automatically acquiring and/or displaying the 3D image volume at the desired orientation, a time spent using the ultrasound system and associated resources may be reduced, improving a functionality of the ultrasound system overall and increasing an availability of the ultrasound system for use on other patients and/or by other radiologists. Further, the methods described herein may achieve a more accurate orientation of the 3D image volume with respect to the cross-sectional plane than can be achieved manually by the radiologist, which may result in a faster and more efficient diagnosis of the patient.

The technical effect of automatically acquiring and/or orienting a 3D ultrasound image volume such that a uterus and/or endometrium included in the 3D ultrasound image volume is displayed aligned with a cross-sectional plane of the 3D ultrasound image volume is that a time spent by a radiologist reading the 3D ultrasound image volume may be reduced, an efficiency of a workflow of the radiologist may be increased, and an overall usage of an ultrasound imaging system may be reduced.

The disclosure also provides support for a transvaginal ultrasound system (TVUS), comprising: an image processing system including a processor and a non-transitory memory storing instructions that when executed, cause the processor to: acquire a three-dimensional (3D) ultrasound image volume of a uterus of a subject of a scan performed using the TVUS, where an endometrium of the uterus is aligned with a cross-sectional plane of the 3D ultrasound image volume, and display the 3D ultrasound image volume on a display device of the TVUS. In a first example of the system, further instructions are stored in the non-transitory memory that when executed, cause the processor to align the endometrium with the cross-sectional plane by: receiving a two-dimensional (2D) ultrasound image of the uterus generated from a 2D scan of the uterus of the subject, extracting a medial axis of the endometrium in the 2D ultrasound image, generating a uterine trace line of the uterus based on the extracted medial axis, and acquiring the 3D ultrasound image volume of the uterus with the endometrium aligned with the cross-sectional plane of the 3D ultrasound image volume based on the uterine trace line. In a second example of the system, optionally including the first example, further instructions are stored in the non-transitory memory that when executed, cause the processor to perform a segmentation of the endometrium using a segmentation model, and extract the medial axis from the segmented endometrium. In a third example of the system, optionally including one or both of the first and second examples, further instructions are stored in the non-transitory memory that when executed, cause the processor to generate the uterine trace line based on the extracted medial axis by fitting a polynomial function to the extracted medial axis. In a fourth example of the system, optionally including one or more or each of the first through third examples, further instructions are stored in the non-transitory memory that when executed, cause the processor to perform a segmentation of the uterus using the segmentation model, and extrapolate the uterine trace line from a fundus end of the uterus to a cervix end of the uterus based on the polynomial function and the segmented uterus. In a fifth example of the system, optionally including one or more or each of the first through fourth examples, further instructions are stored in the non-transitory memory that when executed, cause the processor to: perform a segmentation of the endometrium in the 3D ultrasound image volume, and perform a 3D rotation of the 3D ultrasound image volume to align a major axis of the segmented endometrium with the cross-sectional plane of the 3D ultrasound image volume. In a sixth example of the system, optionally including one or more or each of the first through fifth examples, further instructions are stored in the non-transitory memory that when executed, cause the processor to: estimate a set of eigenvectors of the segmented endometrium, estimate a rotation vector based on the estimated set of eigenvectors, and perform the 3D rotation of the 3D ultrasound image volume based on the rotation vector. In a seventh example of the system, optionally including one or more or each of the first through sixth examples, further instructions are stored in the non-transitory memory that when executed, cause the processor to compute a covariance matrix of pixel coordinates in 3D space corresponding to an endometrium mask, and estimating the eigenvectors based on the covariance matrix. In an eighth example of the system, optionally including one or more or each of the first through seventh examples, the endometrium is not aligned with the cross-sectional plane of the 3D ultrasound image volume prior to performing the 3D rotation of the 3D ultrasound image volume. In a ninth example of the system, optionally including one or more or each of the first through eighth examples, the cross-sectional plane is a mid-sagittal plane of the 3D ultrasound image volume. In a tenth example of the system, optionally including one or more or each of the first through ninth examples, further instructions are stored in the non-transitory memory that when executed, cause the processor to display the 3D ultrasound image volume on the display device of the TVUS oriented with the cross-sectional plane visible to a user of the TVUS.

The disclosure also provides support for a method for a transvaginal ultrasound system (TVUS), comprising: receiving a two-dimensional (2D) ultrasound image generated from a scan of a uterus of a subject performed using the TVUS, extracting a medial axis of an endometrium of the 2D ultrasound image, generating a uterine trace line based on the extracted medial axis, acquiring a three-dimensional (3D) image volume of the uterus based on the uterine trace line, wherein the endometrium is aligned with a cross-sectional plane of the 3D image volume, and displaying the 3D image volume on a display device of the TVUS. In a first example of the method, generating the uterine trace line based on the extracted medial axis further comprises performing a segmentation of the endometrium via a segmentation model, and extracting the medial axis from the segmented endometrium. In a second example of the method, optionally including the first example, the method further comprises: generating the uterine trace line by fitting a polynomial function to the extracted medial axis. In a third example of the method, optionally including one or both of the first and second examples, generating the uterine trace line based on the extracted medial axis further comprises performing a segmentation of the uterus via the segmentation model, and extrapolating the uterine trace line based on the polynomial function and the segmented uterus. In a fourth example of the method, optionally including one or more or each of the first through third examples, extrapolating the uterine trace line based on the polynomial function and the segmented uterus further comprises extrapolating the medial axis from a fundus end of the uterus to a cervix end of the uterus. In a fifth example of the method, optionally including one or more or each of the first through fourth examples, acquiring the 3D image volume of the uterus based on the uterine trace line with the endometrium aligned with a cross-sectional plane of the 3D image volume further comprises configuring a mechanical 3D probe to scan from approximately −45° to +45°, with a 0th angle corresponding to the plane where uterine trace line is drawn.

The disclosure also provides support for a method for a transvaginal ultrasound system (TVUS), comprising: receiving a three-dimensional (3D) image volume generated from a scan of a uterus of a subject performed using the TVUS, performing a rotation of the 3D image volume to align an endometrium of the uterus with a mid-sagittal plane of the TVUS, and displaying the 3D image volume with the endometrium aligned with mid-sagittal plane on a display device of the TVUS. In a first example of the method, performing the rotation of the 3D image volume to align the endometrium with the mid-sagittal plane of the TVUS further comprises: performing a segmentation of the endometrium, estimating a set of eigenvectors of the segmented endometrium, determining a major axis of the endometrium based on the eigenvectors, estimating a rotation vector from the set of eigenvectors, rotating the 3D image volume based on the rotation vector. In a second example of the method, optionally including the first example, estimating the set of eigenvectors of the segmented endometrium further comprises computing a covariance matrix of pixel coordinates in 3D space corresponding to an endometrium mask, and estimating eigenvalues and eigenvectors of the covariance matrix.

When introducing elements of various embodiments of the present disclosure, the articles "a," "an," and "the" are intended to mean that there are one or more of the elements. The terms "first," "second," and the like, do not denote any order, quantity, or importance, but rather are used to distinguish one element from another. The terms "comprising," "including," and "having" are intended to be inclusive and mean that there may be additional elements other than the listed elements. As the terms "connected to," "coupled to," etc. are used herein, one object (e.g., a material, element, structure, member, etc.) can be connected to or coupled to another object regardless of whether the one object is directly connected or coupled to the other object or whether there are one or more intervening objects between the one object and the other object. In addition, it should be understood that references to "one embodiment" or "an embodiment" of the present disclosure are not intended to be interpreted as excluding the existence of additional embodiments that also incorporate the recited features.

In addition to any previously indicated modification, numerous other variations and alternative arrangements may be devised by those skilled in the art without departing from the spirit and scope of this description, and appended claims are intended to cover such modifications and arrangements. Thus, while the information has been described above with particularity and detail in connection with what is presently deemed to be the most practical and preferred aspects, it will be apparent to those of ordinary skill in the art that numerous modifications, including, but not limited to, form, function, manner of operation and use may be made without departing from the principles and concepts set forth herein. Also, as used herein, the examples and embodiments, in all respects, are meant to be illustrative and should not be construed to be limiting in any manner.

The invention claimed is:

1. A transvaginal ultrasound system (TVUS), comprising:
an ultrasound probe;
an image processing system including a processor and a non-transitory memory storing instructions that when executed, cause the processor to:
acquire a three-dimensional (3D) ultrasound image volume of a uterus of a subject of a scan performed using the ultrasound probe of the TVUS, where an endometrium of the uterus is aligned with a cross-sectional plane of the 3D ultrasound image volume;
display the 3D ultrasound image volume on a display device of the TVUS;
perform a segmentation of the endometrium in the 3D ultrasound image volume;
perform a 3D rotation of the 3D ultrasound image volume to align a major axis of the segmented endometrium with the cross-sectional plane of the 3D ultrasound image volume;
estimate a set of eigenvectors of the segmented endometrium;
estimate a rotation vector based on the estimated set of eigenvectors; and
perform the 3D rotation of the 3D ultrasound image volume based on the rotation vector:
generate a mask of the endometrium based on the segmented endometrium, and apply the mask to the 3D ultrasound image volume to generate a masked version of the 3D ultrasound image volume, the masked version including image data of the 3D ultrasound image inside the segmented endometrium and excluding image data outside the segmented endometrium; and
compute a covariance matrix of pixel coordinates in 3D space corresponding to the segmented endometrium in the masked version of the 3D ultrasound image volume, wherein estimating the eigenvectors is based on the covariance matrix to reduce a computational load on the image processing system during operation.

2. The TVUS of claim 1, wherein further instructions are stored in the non-transitory memory that when executed, cause the processor to align the endometrium with the cross-sectional plane by:
receiving a two-dimensional (2D) ultrasound image of the uterus generated from a 2D scan of the uterus of the subject;
extracting a medial axis of the endometrium in the 2D ultrasound image;
generating a uterine trace line of the uterus based on the extracted medial axis; and
acquiring the 3D ultrasound image volume of the uterus with the endometrium aligned with the cross-sectional plane of the 3D ultrasound image volume based on the uterine trace line.

3. The TVUS of claim 2, wherein further instructions are stored in the non-transitory memory that when executed, cause the processor to perform the segmentation of the endometrium using a segmentation model, and extract the medial axis from the segmented endometrium.

4. The TVUS of claim 3, wherein further instructions are stored in the non-transitory memory that when executed, cause the processor to generate the uterine trace line based on the extracted medial axis by fitting a polynomial function to the extracted medial axis.

5. The TVUS of claim 4, wherein further instructions are stored in the non-transitory memory that when executed, cause the processor to perform a segmentation of the uterus using the segmentation model, and extrapolate the uterine trace line from a fundus end of the uterus to a cervix end of the uterus based on the polynomial function and the segmented uterus.

6. The TVUS of claim 1, wherein the endometrium is not aligned with the cross-sectional plane of the 3D ultrasound image volume prior to performing the 3D rotation of the 3D ultrasound image volume.

7. The TVUS of claim 1, wherein the cross-sectional plane is a mid-sagittal plane of the 3D ultrasound image volume.

8. The TVUS of claim 1, wherein further instructions are stored in the non-transitory memory that when executed, cause the processor to display the 3D ultrasound image volume on the display device of the TVUS oriented with the cross-sectional plane visible to a user of the TVUS.

* * * * *